April 3, 1962　　C. F. WIEBUSCH　　3,027,859
SIGNAL CONTROLLED STEERING SYSTEMS
Filed April 26, 1944
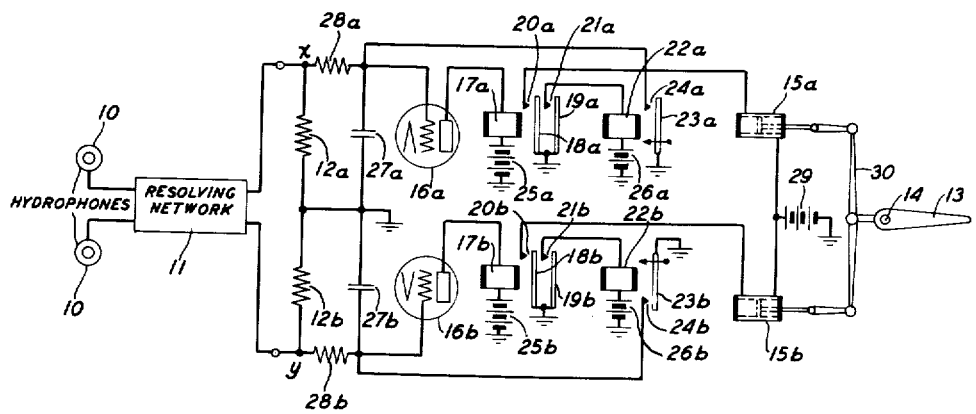
INVENTOR
C. F. WIEBUSCH
BY
Walter C. Kiesel
ATTORNEY

3,027,859
SIGNAL CONTROLLED STEERING SYSTEMS
Charles F. Wiebusch, Millington, N.J., assignor to Bell Telephone Laboratories, Incorporated, New York, N.Y., a corporation of New York
Filed Apr. 26, 1944, Ser. No. 532,860
10 Claims. (Cl. 114—23)

This invention relates to signal controlled steering systems and more particularly to rudder and elevator actuating systems for sonically guided torpedoes of the type disclosed in the application Serial No. 491,795, filed June 22, 1943, of Donald D. Robertson.

One object of this invention is to improve actuating systems for the steering element in a signal controlled steering system and more specifically to simplify such actuating systems for the rudder and elevator in a sonically guided torpedo.

In one illustrative embodiment of this invention, a control system for the rudder of a torpedo comprises a pair of hydrophones mounted on the torpedo for detecting target signals in accordance with which the torpedo is to be steered, and a resolving circuit for converting the outputs of the hydrophones in combination into a direct current potential of amplitude and polarity determined by the off-course angle of the torpedo.

In accordance with one feature of this invention, the actuating system for the rudder comprises a pair of differentially effective solenoids for deflecting the rudder in one direction or the other and the energizing circuit for the solenoids includes means actuated in accordance with the direct current potential aforenoted for supplying current pulses to the solenoids of such character as to deflect the rudder to the extent requisite to bring the torpedo on course toward the target.

More specifically, in accordance with one feature of this invention, the solenoid energizing circuit comprises a plurality of relays and a pair of resistance-condenser timer elements, the relays and timer elements being constructed and arranged so that the current pulses supplied to the solenoids are of fixed amplitude and duration and of a frequency dependent upon the off-course angle. The duration and frequency of the pulses are such that the solenoids and rudder cannot follow so that the solenoids are actuated effectively in accordance with the number of pulses per unit of time and thus are effective to deflect the rudder to an extent requisite to bring the torpedo on course.

The invention and the aforenoted and other features thereof will be understood more clearly and fully from the following detailed description with reference to the accompanying drawing which is a circuit diagram of a steering system illustrative of one embodiment of this invention.

The steering system shown in the drawing comprises a pair of hydrophones 10 and an associated resolving circuit 11 terminating in a pair of equal resistors 12a and 12b. The hydrophones and circuit may be constructed and related as described in the above identified application. In brief, the hydrophones detect signals emanating from the target, for example propeller noises originating at a submarine, and the circuit 11 resolves the hydrophone outputs into a direct current potential across the terminals x and y of the resistors 12, which is related in polarity and proportional in amplitude to the sign and magnitude of the angle between the target and the direction of travel of the torpedo.

This potential is applied to the control or actuating circuit for the rudder 13. The rudder is pivoted at 14 and is coupled to the armatures of the similar solenoids 15a and 15b by a linkage 30. The circuit comprises two substantially identical groups of elements each associated with one of the solenoids, the elements of each group being identified in the drawing by the reference letter, a or b, of the associated solenoid. Each group includes an electron discharge device 16, a relay 17 having a pair of armatures 18 and 19 and associated contacts 20 and 21 respectively, and a slow-to-operate relay 22 having an armature 23 and associated contact 24.

The winding of each relay 17 is connected in the anode circuit of the respective discharge device 16, in series with the plate battery 25. The winding of each relay 22 is connected to the contact 21 of the associated relay 17 and in series with a source such as a battery 26. All the relay armatures are connected to ground as shown.

The input circuit for each discharge device 16 includes a condenser 27 in series with a resistor 28 and connected across the respective resistor 12. The common terminal of the two condensers 27 is connected to the common terminal of the resistors 12 and grounded as shown. The other terminal of each condenser is connected to the contact 24 of the respective relay 22.

Each solenoid 15 is connected to the contact 20 of the associated relay 17 and in series with a direct current source, such as a battery 29.

During operation, when the torpedo is off-course, a potential is impressed between the terminals x and y from the resolving circuit, the polarity and amplitude of this potential being related, as noted heretofore, to the sign and magnitude of the off-course angle. Assume, for purposes of illustration, that the position of the torpedo is such that the terminal x is positive. Then the condenser 27a will charge through the resistor 28 and the discharge device 16a will pass current to cause the relay 17a to operate. Operation of the relay 17a closes the energizing circuit for the solenoid 15a over armature 18a and contact 20a and closes also the energizing circuit for the slow-to-operate relay 22a over armature 19a and contact 21a. After an interval determined by the time constant of the relay 22a, the armature 23a engages contact 24a whereby a short circuit is placed across the condenser 27a. The condenser 27a discharges and, consequently, the relays 17a and 22a release. The condenser 27a then begins to charge again, and the cycle of operations is repeated so that pulses of current are supplied to the solenoid 15a.

The length or duration of the current pulses will be determined, as is apparent, by the time constants of the relays 17a and 22a and the interval between pulses is determined by the capacitance of the condenser 27a, the resistance 28a and the magnitude of the potential appearing across the terminals x and y. The mechanical and electrical parameters involved in the determination of the pulse duration and interval are correlated, in ways known in the art, so that the solenoid armature cannot follow. Consequently, it will be seen, the armature of the solenoid is displaced a distance proportional to the off-course deviation of the torpedo and the rudder is deflected accordingly.

If the position of the torpedo with respect to the target were such that the terminal y were positive, current pulses would be supplied to the solenoid 15b in the same manner as described above with reference to the solenoid 15a, and the rudder 13 would be deflected in the opposite direction to bring the torpedo on course.

When the torpedo is on course, no potential difference appears between the terminals x and y so that neither solenoid 15 is energized and the rudder 13 remains at its neutral position.

Although a specific embodiment of the invention has been shown and described it will be understood that it is but illustrative and that various modifications may be made therein without departing from the scope and spirit of this invention as defined in the appended claims.

What is claimed is:

1. A signal controlled steering system comprising a steering member, solenoid means for deflecting said steering member, an impedance, means for impressing a control signal across said impedance, and means for actuating said solenoid means in accordance with the polarity and magnitude of said control signal comprising means responsive to said signal for supplying to said solenoid means current pulses of fixed length and of frequency proportional to the magnitude of said signal.

2. A signal controlled steering system comprising a steering member, solenoid means for deflecting said steering member, an impedance, means for impressing a direct current control potential across said impedance, and means for actuating said solenoid means in accordance with the polarity and magnitude of said potential, said actuating means comprising an energizing circuit for said solenoid and means for closing said circuit for periods of preassigned duration and at intervals proportional to the magnitude of said potential.

3. A signal controlled steering system comprising a steering member, a pair of differentially operable solenoids for deflecting said member in opposite directions, an impedance, means for impressing a control potential across said impedance, an energizing circuit for each solenoid, and means for closing one energizing circuit or the other in accordance with the polarity of said potential for periods of preassigned length and at intervals determined by the magnitude of said potential.

4. A signal controlled steering system for a moving body comprising a steering member, differentially operable solenoid means for deflecting said member in opposite directions, means for producing a control potential related in polarity and amplitude to the sign and magnitude respectively of the off-course angle of said body, and means for energizing said solenoid means in accordance with the polarity of said potential for periods of preassigned length and at intervals proportional to the amplitude of said potential.

5. A signal controlled steering system comprising a steering member, solenoid means for deflecting said member, and an energizing circuit for said solenoid means, said energizing circuit including slow-to-operate relay means, an energizing circuit for said relay means including second relay means effective when operated to cause energization of said solenoid means, an energizing circuit for said second relay means comprising condenser means and a charging circuit therefor, means for impressing a control signal upon said charging circuit and means responsive to operation of said first relay means for short-circuiting said condenser means.

6. A signal controlled steering system comprising a steering member, a pair of solenoids differentially operable to deflect said member in opposite directions, a pair of condensers, charging circuits for said condensers, means for producing a control potential, means for establishing in one or the other of said circuits, in accordance with the polarity of said control potential, a potential proportional to said control potential, means responsive to charging of either condenser for energizing a corresponding one of said solenoids, and means for short-circuiting each condenser at a preassigned time after the initiation of the charging thereof.

7. A steering system for a moving body comprising a steering member, a pair of solenoids differentially operable to deflect said member in opposite directions, a pair of control circuits one for each solenoid, each circuit including an energizing source, a relay for including said source in circuit with the solenoid, a second relay controlled by operation of said first relay, means including a condenser for operating said first relay in response to charging of said condenser and means responsive to energization of said second relay for short-circuiting said condenser at a predetermined period after initiation of the charging thereof, and means for charging one condenser or the other in accordance with the off-course direction of the body and proportionately to the off-course angle of the body.

8. A steering system for a moving body comprising a steering member, a pair of solenoids differentially operable to deflect said member in opposite directions, a pair of condensers, a pair of resistances each in circuit with a corresponding condenser, means for charging one condenser or the other in accordance with the off-course direction of the body and proportionately to the magnitude of the off-course angle, a pair of electron discharge devices the input circuit of each of which includes a corresponding one of said condensers, an energizing circuit for each solenoid, and a pair of relay means, each associated with a respective solenoid and a respective electron discharge device for closing the energizing circuit for the respective solenoid for periods of preassigned duration and at intervals determined by the time constant of the respective condenser and associated resistance.

9. A steering system for a moving body comprising a steering member, a pair of solenoids differentially operable to deflect said steering member in opposite directions, an impedance, means for impressing across said impedance a potential related in polarity and amplitude to the sign and magnitude respectively of the off-course angle of the body, and means for controlling said solenoids to effect energization of one or the other thereof in accordance with the polarity of said potentials, said controlling means comprising a pair of condensers serially connected across said impedance and having the common terminal thereof connected to the mid-point of said impedance, a pair of electron discharge devices each having an input circuit including a respective condenser, a pair of relays each included in the output circuit of a respective discharge device, an energizing circuit for each solenoid, means responsive to operation of each relay for closing the energizing circuit of a respective solenoid and other means responsive to operation of each relay for short-circuiting the respective condenser.

10. A steering system for a moving body comprising a steering member, a pair of solenoids differentially operable to deflect said member in opposite directions, an energizing circuit for each solenoid, a pair of similar control circuits for said energizing circuits, each control circuit comprising a slow-to-operate relay, a second relay for closing the operating circuit for said first relay and for closing the respective energizing circuit, an electron discharge device the output circuit of which includes said second relay, an input circuit for said device including a condenser and a resistance in series with said condenser and a contact of said first relay closed when said first relay operates, to short-circuit said condenser, the two condensers being connected in series, and means for impressing across said condensers in series a potential related in polarity and amplitude to the sign and magnitude respectively of the off-course angle of the body.

No references cited.